United States Patent
Nauth et al.

(10) Patent No.: US 6,242,017 B1
(45) Date of Patent: Jun. 5, 2001

(54) STABILIZATION OF COOKED MEAT COMPOSITIONS STABILIZED BY NISIN-CONTAINING WHEY AND METHOD OF MAKING

(75) Inventors: K. Rajinder Nauth, Wheeling; Debora D. Ruffie, Mt. Prospect; Michael G. Roman, Grayslake, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/386,793

(22) Filed: Aug. 31, 1999

Related U.S. Application Data
(60) Provisional application No. 60/098,465, filed on Aug. 31, 1998.

(51) Int. Cl.[7] .................................................. A23C 21/02
(52) U.S. Cl. .................................. 426/41; 426/42; 426/43; 426/56; 426/59; 426/583; 426/589; 426/641; 426/643; 426/644; 426/654
(58) Field of Search .................................. 426/41, 42, 43, 426/56, 59, 641, 643, 644, 654, 583, 589

(56) References Cited

U.S. PATENT DOCUMENTS

| | | | |
|---|---|---|---|
| 3,093,551 | 6/1963 | Hall | 195/96 |
| 4,584,199 | 4/1986 | Taylor | 426/36 |
| 4,597,972 | 7/1986 | Taylor | 426/36 |
| 4,740,593 | 4/1988 | Gonzalez et al. | 435/243 |
| 4,798,729 | 1/1989 | Anders et al. | 426/326 |
| 4,888,191 | 12/1989 | Anders et al. | 426/281 |
| 5,015,487 | 5/1991 | Collison et al. | 426/332 |
| 5,017,391 | 5/1991 | Anders et al. | 426/129 |
| 5,186,962 | 2/1993 | Hutkins et al. | 426/61 |
| 5,338,682 | 8/1994 | Sasaki et al. | 435/253.4 |
| 5,451,369 | 9/1995 | Daeschel et al. | 422/28 |
| 5,458,876 | 10/1995 | Monticello | 424/94.61 |

FOREIGN PATENT DOCUMENTS

| | | |
|---|---|---|
| 844782 | 8/1960 | (GB) . |
| 2059716 | * 5/1996 | (RU) . |
| 507055 | * 2/1979 | (SU) . |

OTHER PUBLICATIONS

Delves–Broughton, J., "NISIN and Its Uses as a Food Preservative", Food Technology, vol. 44, No. 11, 1990.

Bell, R. G. et al., "The effect of nisin–sodium chloride interactions on the outgrowth of *Bacillus licheniformis* spores", Journal of Applied Bacteriology, vol. 159, 1985, pp. 127–132.

Buncic, S. et al., "Individual and Combined Listericidal Effects of Sodium Lactate, Potassium Sorbate, Nisin and Curing Salts at Refrigeration Temperature", Journal of Food Safety, vol. 15, No. 2, 1995, pp. 247–264.

(List continued on next page.)

Primary Examiner—Helen Pratt
(74) Attorney, Agent, or Firm—Fitch, Even, Tabin & Flannery

(57) ABSTRACT

The present invention provides a stabilized meat product of cooked meat comprising cooked meat and nisin-containing whey. The nisin-containing whey is prepared by a inoculating a pasteurized dairy composition with a culture of a nisin-producing microorganism, incubating the composition until the pH attains a value between about 6.2 and about 2.0 and a whey and curd mixture is formed, and separating the whey from the whey and curd mixture to give the separated whey which is the nisin-containing whey. The invention also provides a method of making a stabilized meat product of cooked meat, that includes preparing a composition including meat and nisin-containing whey, and cooking the composition. The invention additionally provides a method of inhibiting the growth of a pathogenic microorganism in cooked meat that includes preparing a composition comprising meat and nisin-containing whey, sealing the cooked composition into packaging, and cooking the composition; whereby the growth of a pathogenic microorganism is inhibited.

43 Claims, 1 Drawing Sheet

OTHER PUBLICATIONS

Nykanen, Anne, et al., "The Effect of Lactic Acid, Nisin Whey Permeate, Sodium Chloride and Related Combinations on Aerobic Plate Count and the Sensory Characteristics of Rainbow Trout", Lebensmittel Wissenschaft und Technologie, vol. 31, No. 3, 1998, pp. 286–290.

Hurst, A., "Nisin", Advances in Applied Microbiology, vol. 27, pp. 85–1234.

Chung et al., "Effects of Nisin on Growth of Bacteria Attached to Meat", Applied and Environmental Microbiology, vol. 55, No. 6, Jun. 1989, p. 1329–1333.

Fowler, G. G. , "La Conservation Des Produits Alimentaires Au Moyen de la Nisine" Revue des Fermentations et des Industries Alimentaires, vol. 34, No. 5, 1979, pp. 157–159.

Chung et al., "Effects of Nisin on Growth of Bacteria Attached to Meat", Applied and Environmental Microbiology, vol. 55, No. 6, Jun. 1989, p. 1329–1333.

Maas et al. "Sodium Lactage Delays Toxin Production by *Clostridium botulinum* in Cook–in–Bag Turkey Products", *Applied and Environmental Microbiology,* Sep. 1989, vol. 55, No

_US 6,242,017 B1_

STABILIZATION OF COOKED MEAT COMPOSITIONS STABILIZED BY NISIN-CONTAINING WHEY AND METHOD OF MAKING

This application claims the benefit of U. S. Provisional Application 60/098,465 filed Aug. 31, 1998.

FIELD OF THE INVENTION

This invention relates to stabilization of compositions containing cooked meat, especially turkey-gravy compositions, against the development of toxins from pathogenic bacterial contaminants. The stabilized compositions are attained by the incorporation of nisin-containing whey derived from a nisin-producing culture. The invention also relates to a method of stabilizing a composition containing cooked meat against the development of toxins, wherein the method comprises adding nisin-containing whey derived from a nisin-producing culture to the cooked meat.

BACKGROUND OF THE INVENTION

Packaged precooked meat and gravy combinations are commonly available to the public in vacuum sealed airtight packets, such as those made of pliable plastic films. The packets are termed airtight to the extent that the films are relatively impermeable to air, so that the components sealed within them at the time of preparation remain largely anaerobic. Such products must be prepared free of pathogenic organisms, especially toxin-producing anaerobes. Pathogenic organisms that may contaminate packaged meats include, by way of nonlimiting example, _Clostridium botulinum_, _C. perfringens_, (Lucke et al., in "Ecology and Control Foods" (A.H.W. Hauschild and K.L. Dodds, eds.) Marcel Dekker, N.Y., 1993, pp. 177–207; Smart et al., J. Appl. Bacteriol. 46, 377–383 (1979); Roberts et al., J. Fd. Technol. 14, 211–226 (1979); Tompkin, Food Technology 34, 229–236, and 257 (1980); Bryan et al., Amer. Public Health 61, 1869–1885 (1971); Microbial Ecology of Food Commodities—Microorganisms in Foods 6: Blackie Academic and Professional, 1998, p. 115), _Listeria monocytogenes, Escherichia coli, Bacillus cereus, Enterococcus faecalis_, and similar microorganisms. Among these, spore-forming, toxin-producing microorganisms are of particular concern, because any spores produced by viable cells may survive and grow to produce toxins subsequent to manufacturing or domestic heating steps. Such microorganisms include species of the genus Clostridium.

In U.S. Pat. No. 4,888,191 and 5,017,391 Anders et al. disclose compositions and methods related to the use of lactate salts to delay _C. botulinum_ growth in a foodstuff such as fish or poultry. The foods are heated to a temperature sufficient to cook the meat but not to sterilize the product. Anders et al. suggest that lactate may be used alone, or in combination with other agents such as sodium nitrite. These patents fail to discuss nisin or its properties.

Maas et al. (Appl. Envir. Microbiol. 55, 2226–2229 (1989)) report that lactate, when incorporated into a turkey meat vacuum-packed composition, delays the generation of botulinum toxin in a manner directly dependent on the concentration of lactate introduced into the composition. Maas et al. do not mention nisin.

Nisin is a peptide-like antibacterial substance produced by microorganisms such as _Lactococcus lactis_ subsp. lactis (formerly known as _Streptococcus lactis_). Its structure is illustrated in U.S. Pat. No. 5,527,505 to Yamauchi et al. The highest activity preparations of nisin contain about 40 million IU per gram. A commercial preparation, NISAPLIN™, containing about 1 million IU per gram is available from Aplin & Barrett Ltd., Trowbridge, England. Nisin has no known toxic effects in humans. It is widely used in a variety of prepared dairy foods. Experimental use in preserving other foods has also been reported. Details on these applications are provided below.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (Indian Journal of Dairy Science 28: 71–72 (1975)) incorporated the nisin producing culture _Streptococcus lactis_ (now known as _L. lactis_ subsp. _lactis_) along with the yogurt culture before fermentation. Others introduced nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)). In all cases, the rate of post-fermentation acidification was only partially inhibited by these treatments and the yogurt continued to become more acidic throughout its shelf life.

In U.S. Pat. No. 5,527,505, by Yamauchi et al., yogurt was produced from raw milk by incorporating a nisin-producing strain, _Lactococcus lactis_ subsp. _lactis_, along with the traditional yogurt culture consisting of _Streptococcus salivarius_ subsp. _thermophilus_ (ST) and _Lactobacillus delbrueckii_ subsp. _bulgaricus_ (LB). Yamauchi et al. teach that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64% to 96% in 14 days, in various experiments inoculated with differing amounts of _L. lactis_ subsp. _lactis_, compared to the initial acidity at the completion of fermentation. Other studies (Hogarty et al., J. Fd. Prot. 45:1208–1211 (1982); Sadovski et al., XX International Dairy Congress, Vol. E: 542-5–44 (1978)) also noted acid production and development of bitterness at low temperature by some mesophilic starter lactococci in dairy products.

In U.S. Pat. No. 5,015,487 to Collison et al., the use of nisin, as a representative of the class of lanthionine bacteriocins, to control undesirable microorganisms in heat processed meats is disclosed. In tests involving dipping frankfurters in nisin solutions, the growth of _L. monocytogenes_ was effectively inhibited upon storage at 4° C.

Chung et al. (Appl. Envir. Microbiol. 55, 1329–1333 (1989)) report that nisin has an inhibitory effect on gram-positive bacteria, such as _L. monocytogenes, Staphylococcus aureus_ and _Streptococcus lactis_, but has no such effect on gram-negative bacteria such as _Serratia marcescens, Salmonella typhimurium_ and _Pseudomonas aeruginosa_ when these microorganisms are attached to meat.

Nisin has been added to cheeses to inhibit toxin production by _Clostridium botulinum_ (U.S. Pat. No. 4,584,199 to Taylor). U.S. Pat. No. 4,597,972 to Taylor discloses a detailed example in which chicken frankfurter components are shown to require the presence of both added nitrite and added nisin in order to prevent or delay botulinum toxin production when challenged with _C. botulinum_.

Nisaplin™ has been found to preserve salad dressings from microbiological contamination, such as challenge by _Lactobacillus brevis_ subsp. lindneri, for an extended shelf life period (Muriana et al., J. Food Protection 58:1109–1113 (1995)).

There remains a need for compositions and procedures related to prepared meat products that inhibit the growth of pathogenic microorganisms, and the production of toxins by them, using natural or innocuous ingredients. In particular, there is a need for such compositions and methods that avoid the introduction of nitrite, the use of which has been the subject of extended controversy. The present invention addresses this need.

SUMMARY OF THE INVENTION

The present invention provides a stabilized preparation of cooked meat comprising cooked meat and nisin-containing whey. In an important embodiment, the nisin-containing whey is prepared by inoculating a pasteurized dairy composition with a culture of a nisin-producing microorganism, incubating the composition until the pH attains a value between about 6.2 and about 4.0 and a whey and curd mixture is formed, and separating the whey from the whey and curd mixture to give the separated whey which is the nisin-containing whey. In an alternative embodiment, the nisin-containing whey is obtained from the fermentation of a fortified cheese whey composition using a nisin-producing microorganism. The invention also provides a method of making a stabilized preparation of cooked meat, that includes preparing a composition including meat and nisin-containing whey, and cooking the composition. The invention additionally provides a method of inhibiting the growth of a pathogenic microorganism in cooked meat that includes preparing a composition comprising meat and nisin-containing whey, sealing the cooked composition into packaging, and cooking the composition, whereby the growth of a pathogenic microorganism is inhibited.

In important embodiments of the preparation and methods of the invention, the growth of microorganisms chosen from the group consisting of *Clostridium botulinum C. perfringens, Listeria monocytogenes, Bacillus cereus, Staphylococcus aureus*, and *Enterococcus faecalis* is inhibited, and in a more preferred embodiment, the inhibited microorganism is *C. botulinum*. In additional preferred embodiments of the preparation and methods, the nisin-containing whey is added in a proportion from about 10% to about 50% by weight, and more preferably this proportion is about 25% to about 35% by weight. In yet additional preferred embodiments, the cooked meat is beef, pork, lamb, poultry, fish, seafood, or a mixture thereof, more preferably, the cooked meat is poultry such as turkey, chicken, duck, or a mixture thereof; yet more preferably, the poultry is turkey. In further preferred embodiments, the stabilized preparation additionally includes a gravy, and furthermore contains no nitrite salts.

DETAILED DESCRIPTION OF THE INVENTION

Figure 1:
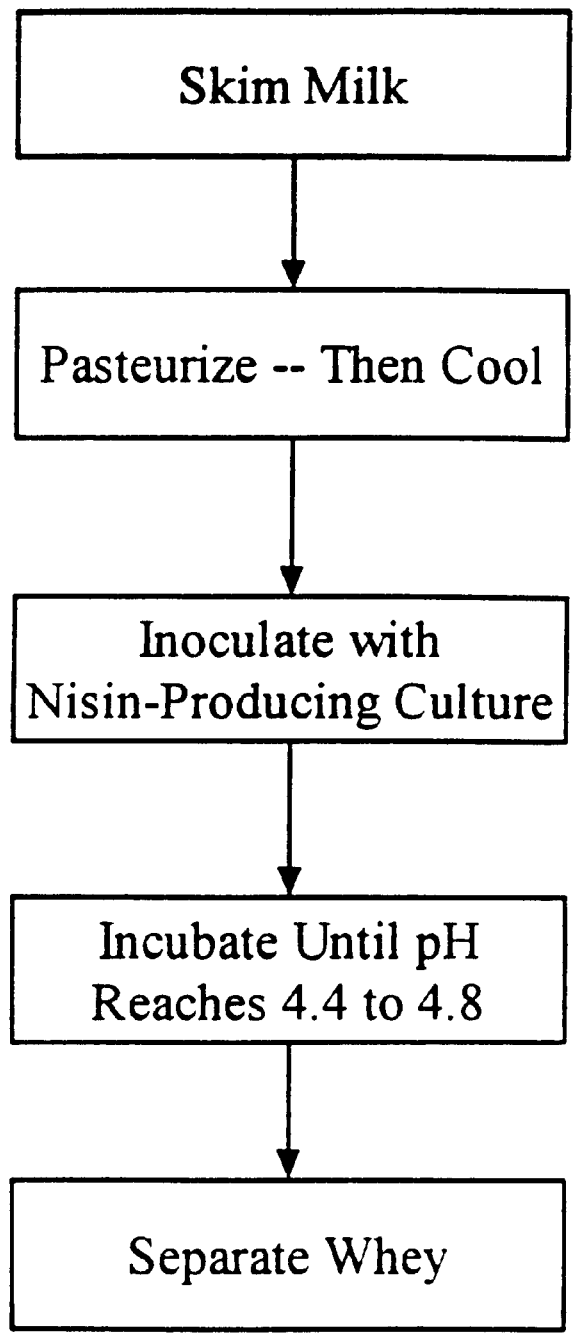
FIG. 1 provides a flow chart of steps used in the production of nisin-containing whey.

This invention relates to a stabilized preparation of cooked meat, and to methods of preserving cooked meat and of inhibiting the growth of pathogenic microorganisms in preparations of cooked meat. The preparation and methods have as their central feature the use of nisin-containing whey as the component responsible for the stabilizing activity in the processed meat preparations. The preservative and stabilizing effects of nisin-containing whey find application in the preparation of other food products in addition to stabilized meat products. These include stabilized fermented dairy products, mayonnaise-type spreads, and cream cheese products. Disclosures of these inventions, which are related to the instant application, appear in the applications entitled "Stabilization of Fermented Dairy Compositions Using Whey from Nisin-Producing Cultures", U.S. Ser. No. 60/098,518, filed Aug. 31, 1998, "Stabilization of Mayonnaise Spreads Using Whey from Nisin-Producing Cultures", U.S. Ser. No. 60/098,516, filed Aug. 31, 1998, and "Stabilization of Cream Cheese Compositions Using Nisin-Producing Cultures", U.S. Ser. No. 60/098,472, filed Aug. 31, 1998, respectively, and are incorporated hereby in their entireties by reference.

For purposes of this invention, the term "nisin-containing whey" is intended to include the whey product, separated from the curd, derived from a nisin-producing culture. Generally, such a nisin-containing whey is obtained by any of a variety of equivalent procedures involving the fermentation of a nisin-producing microorganism. In one such procedure, a pasteurized dairy product such as milk or whey is first inoculated with the nisin-producing microorganism. After the dairy product curdles, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using nisin-producing microorganisms. In this procedure, after the pH in the fermentation has fallen to about 5.5, the pH is then maintained at this value for 8–10 hrs before allowing the pH to drop further. The nisin-containing whey, separated from the corresponding curds, is then employed in the products and methods of this invention.

It is shown in the copending application entitled "Stabilization of Fermented Dairy Compositions Using Whey from Nisin-Producing Cultures", U.S. Ser. No. 60/098,518, filed Aug. 31, 1998, that nisin-containing whey has effects on nonpathogenic microorganisms beyond those obtained by addition of a purified preparation of nisin. Furthermore, it is shown in Example 2 that nisin-containing whey contains, or preserves, a significant concentration of lactate characteristic of whey. Thus nisin-containing whey may in general be understood to contain both nisin and lactate.

The fermenting cultures capable of producing nisin-containing whey have the potential of secreting many fermentation products into the medium, namely, into the whey of the culture. Thus, in addition to nisin and lactate, there may be further components present in nisin-containing whey produced by the fermentations yielding this whey. Among such components may be certain substances which contribute to the beneficial properties of the preservable preparations of the invention, and to the beneficial effects of the methods of the invention. Without wishing to limit the scope of this invention, therefore, the term "nisin-containing whey" encompasses all components contained therein, both those currently known and those which may remain uncharacterized at the present time, that contribute to the beneficial attributes of the present invention.

As used herein, "nisin-containing whey" also relates to the whey described above that has subsequently been reduced in volume to a more concentrated liquid, or that has been completely dried, by evaporation, lyophilization or comparable procedure. The term relates additionally to such a concentrated or dried whey that is subsequently reconstituted, either partially or completely, by the addition of water or a water-containing composition.

As used herein, "cooked" meat or "cooking" relate to heating the meat which is the subject of the present invention in the presence of high humidity or of liquid water to a temperature and for a time sufficient to cook the meat, i.e., to convert it from its raw starting state. Commonly the temperature employed or the time of treatment are sufficient to raise the internal temperature to a particular value, or within a particular range of values, which is considerably below the boiling point of water. Such temperatures therefore may not be sufficient to kill or inactivate certain heat resistant pathogenic microorganisms, in particular their spores. A specific microorganism of concern in this regard is *C. botulinum*.

As used herein, the term "stabilized preparation" as applied to cooked meat relates to a preparation which has been treated so that the growth of pathogenic microorganisms that may contaminate the preparation is inhibited or is retarded, or in which the production of toxins by such microorganisms is inhibited or retarded.

As used herein, "gravy" relates to gravies and sauces incorporated into the meat preparation in order to impart flavor and favorable organoleptic properties to it. The gravy provides a preferred composition for the incorporation of the nisin-containing whey into the stabilized preparations and in implementing the methods of the invention. This is readily accomplished by replacing some or all of the water that would otherwise be used to constitute the gravy by the nisin-containing whey of the invention. In addition, the gravies and sauces may contain other components that are commonly employed in their preparation. Such ingredients are widely known among food chemists.

Meats that are to be used in this invention may be obtained from mammalian sources such as beef, pork, and lamb, as well as from poultry, vertebrate fish, and nonvertebrate seafood. In important embodiments of the present invention, the meat is poultry, and in particular is turkey. In general, the meat employed in the methods of the invention may be either raw or already cooked prior to use in the present methods.

As shown in the copending application entitled "Stabilization of Fermented Dairy Compositions Using Whey from Nisin-Producing Cultures", U.S. Ser. No. 60/098,518, filed Aug. 31, 1998, nisin-containing whey has beneficial effects when incorporated into fermented dairy products such as yogurts, buttermilks, and sour creams. Yogurt is generally made by fermenting milk with a culture that contains thermophilic organisms such as *Streptococcus salivarius* subsp. *thermophilus* (*ST*) and *Lactobacillus delbrueckii* subsp. *bulgaricus* (*LB*). Additional cultures such as *Lactobacillus acidophilus* and bifidobacteria may also be included. Conventional fermented dairy products such as these continue to form acidic products, and in some cases, to develop bitterness, upon storage over times routinely involved in shipping them, selling and domestic storage. The addition of nisin-containing whey to such fermentations inhibits these undesired effects, conferring beneficial stability and taste to the products. These effects may not be ascribable to the presence of lactate in the nisin-containing whey, however, because all lactic fermentations by their nature produce lactic acid and yet are not stable to storage.

These effects on dairy cultures furthermore cannot be achieved by the addition of purified nisin to the cultures. Introducing purified nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)) only partially inhibited the rate of post-fermentation acidification, and the yogurt continued to become more acidic throughout its shelf life. Thus nisin alone is not capable of preventing continued acidification; as shown in the Examples, nisin-containing whey is required to achieve these results. It may be inferred that nisin-containing whey may also contain additional components currently not identified that contribute to the attainment of these beneficial effects. As noted above, the lactate found in nisin-containing whey cannot be considered responsible for these properties.

Stabilization of foods such as cooked meats against the hazardous proliferation of pathogenic microorganisms is shown in the present invention to result from the incorporation of nisin-containing whey in such foods. The Examples demonstrate that cooked meats formulated with gravy compositions prepared using the nisin-containing whey of the invention inhibit the production of toxins upon challenge with the spores of *Clostridium botulinum*, whether proteolytic or nonproteolytic. Control samples containing purified nisin and lactate are ineffective in conferring this protective benefit upon challenged samples.

The nisin-containing whey used in this invention may be obtained using a procedure that includes the following steps: (i) pasteurizing a dairy liquid such as milk, whether whole milk, partially defatted milk or skim milk, (ii) cooling and inoculating the liquid with a culture of a nisin-producing microorganism, (iii) incubating until the pH has fallen to a range of 4.4 to 4.8 as a result of the fermentation, whereupon a suspension of curds in liquid whey is formed, and (iv) separating the curds from the whey, for example by centrifugation or filtration (see FIG. 1). Alternatively, nisin-containing whey may be prepared by the sequential steps of (i) preparing an aqueous composition comprising sweet whey from the fermentation of a cheese, whey protein concentrate, and a protein hydrolysate; (ii) fermenting the aqueous composition with a nisin-producing culture until the pH attains about 5.5; (iii) maintaining the pH of the fermenting composition at about 5.5 for 8–10 hrs; and (iv) allowing the pH of the fermenting composition to drop to 4.8 or lower. An example of a nisin-producing microorganism is *Lactococcus lactis* subsp. *lactis*. The resulting whey is the nisin-containing whey of the invention.

In order to prepare the stabilized meats of the invention, the meat is combined with a gravy or sauce that is formulated using an effective amount of the nisin-containing whey derived from a nisin-producing culture as a portion or all of the aqueous component contained therein. Generally, such effective amounts may range from about 70% to about 90% of the gravy. In addition, the gravy may contain flavorings including herbs and spices, colorings, thickening agents including starches, pectins, and similar polysaccharides, fats or oils, and emulsifiers. It may also be supplemented with inorganic salts of lactic acid. The gravy components are combined and cooked to a temperature in the range of about 170° F. to about 200° F., preferably to about 190° F., and then cooled to a refrigerated temperature such as about 40° F.

The meat used in the food preparation may be either raw or already cooked prior to combination with the gravy. Cooking prior to incorporation into the preparation generally entails heating the meat to a temperature in the range of about 150° F. to about 180° F., preferably about 160° F., and then cooling to a refrigerated temperature of about 40° F. In general, the meat may be various cuts of beef, veal, pork, or lamb. It may also be a poultry meat, which may be by way of nonlimiting example, turkey, chicken, or duck. The meat may also be a seafood product, such as a vertebrate fish or an invertebrate shellfish. In significant embodiments of the invention, the meat is poultry, and in particularly important embodiments the poultry is turkey.

The gravy or sauce is combined with the meat to be used in the food preparation. In important applications of the method, the final product in which the preparation of the invention appears is a single serving contained in a flexible pouch, for example, one made of a plastic film. Therefore the meat, when it is to be incorporated into such a product, is sliced or otherwise reduced into portions appropriate for such a final product. The gravy and meat are combined in proportions ranging from about 20% gravy/80% meat to about 60% gravy/40% meat, preferably about 35% gravy/65% meat.

The gravy-meat combination is then cooked in order to make the final preparation. For example, the final preparation may be a plastic pouch containing a serving of gravy-meat mixture. In such a case, the mixture is introduced into the pouch and sealed after drawing a vacuum. The gravy-meat mixture is then cooked until its temperature attains a temperature in the range from about 150° F. to about 180° F., preferably to a temperature of about 165° F. This may be accomplished by heating in a bath, or using a heat source, maintained at a temperature of about 190° F. The heating step may endure for a time ranging from about 10 min to about 60 min, and preferably lasts about 30 min. At the conclusion of the heating step, the product is cooled to a refrigerated temperature of about 40° F.

EXAMPLES

General Methods. Aerobic plate count was performed using the procedure outlined in Bacteriological Analytical Manual (U.S. Food and Drug Administration), 8th Edition, 1995, Chapter 3. The plating medium used was brain heart infusion (BHI) agar. *Streptococcus salivarius* subsp. *thermophilus* (*ST*) was enumerated on M17 agar (Atlas, R. M., 1993, Handbook of Microbiological Media, CRC Press, Inc., Pages 148, 532, 621). *Lactobacillus bulgaricus* (*LB*) was enumerated on MRS agar (Atlas, ibid). The plates for *ST* and *LB* were incubated anaerobically at 40° C. for two days. The nisin producing lactococci were enumerated on BHI agar, incubated anaerobically at 30° C. for two days. Anaerobic plate count was performed using prepoured McClung's Egg Yolk agar. The sample was spread plated and incubated 48 hours at 86° F. in a Coy Anaerobic Chamber.

Nisin activity in the fermented milk was determined by the method of Fowler et al. (Techn. Series Soc. Bacteriol. 8:91–105 (1975)). The strain *L. lactis* subsp. *cremoris* that is sensitive to nisin was used as an indicator. Nisaplin™, a standardized preparation of nisin ($10^6$ units/g) from Aplin and Barrett, was used as the standard to determine nisin activity in various preparations. Each assay plate had nisin standards.

Toxin extraction was done on each sample by using the procedure for botulinal toxin (Bacteriological Analytical Manual (U.S. Food and Drug Administration) 8th Edition, 1995, Chapter 17). A Tekmar Stomacher 400 Lab Blender and sterile bags were used for maceration of samples in gel phosphate buffer. Standard mouse bioassays and toxin confirmations were performed as outlined in the FDA's Bacteriological Analytical Manual.

PRODUCTION OF NISIN-CONTAINING WHEY AND USE IN DAIRY PRODUCTS

Example 1

This example illustrates the production of nisin-containing whey from a nisin-producing culture. The significant steps involved are shown schematically in FIG. 1. A nisin-producing culture was inoculated at $5 \times 10^6$ CFU/ml in pasteurized skim milk cooled to 30° C. The mixture was allowed to incubate for about 16 hours and was then cooled to 5–7° C. The fermented milk had about $8.0 \times 10^8$ CFU/ml of the cultured bacteria, a pH of about 4.4 to 4.6, and a titratable acidity of 0.75%. It contained nisin equivalent activity of about 1300 international units/ml as determined by well assay using a nisin-sensitive strain of *Lactococcus lactis* subsp. *cremoris*. The cultured milk was centrifuged to separate the whey from the curd and the nisin-containing whey removed. A detailed comparison between the fermented milk and the resulting whey is given in Table 1. The whey contained more than about 100-fold fewer CFU/ml of the nisin-producing microorganisms compared to the fermented milk culture while still preserving the full nisin activity of the fermented milk. The curd retained more than 99% of the lactococcus counts determined for whey and curd together.

TABLE 1

Characteristics of Centrifuged Nisin-Containing Whey Obtained from Lactococcus-Fermented Skim Milk

|  | Fermented Milk | Whey | Curd |
| --- | --- | --- | --- |
| pH | 4.43 | 4.45 | 4.5 |
| Titratable acidity | 0.75% | 0.54% | — |
| Culture count | $8.0 \times 10^8$ CFU/ml | $6.6 \times 10^6$ CFU/ml | $3.9 \times 10^9$ CFU/g |
| Nisin equivalent activity | 1300 IU/ml | 1300 IU/ml | 600 IU/g |

Example 2

This example also illustrates the preparation and properties of a nisin-containing whey derived from a nisin-producing culture. Milk was fermented with approximately $5 \times 10^6$ CFU/g nisin-producing lactococci until the culture attained a pH of 4.43. The fermented milk was then centrifuged at 10,000 rpm for 15 minutes and the supernatant (i.e., whey) was recovered. The whey had a pH of 4.45 and a nisin activity of about 1300 IU/ml (essentially the same values as in the fermented milk prior to centrifugation). The whey had a culture population of $6.6 \times 10^6$ CFU/ml (as compared to $8.0 \times 10^8$ CFU/ml in the original fermented milk; see Table 1). The whey recovered from a dairy fermentation of nisin-producing microorganisms has a titer of nisin-producing lactococci that is less than about 1% of that of the fermentation prior to separation of the whey.

In a second run, a skim milk/whey mixture was fermented at pH 5.5 for about 8–10 hours and then allowed to acidify further to a pH of about 4.6. The resulting nisin-containing whey from a pH controlled propagation had a pH of about 4.65, a lactate concentration of about 13.05 g/L, and a nisin activity of aobut 2,100 U/g.

Example 3

This example provides an alternative fermentation for nisin-containing whey yielding a high level of nisin equivalent activity. Sweet whey from fermentations of cheeses such as Swiss cheese, Parmesan cheese, mozzarella cheese, or cheddar cheese is fortified with whey protein concentrate (WPC) and a protein hydrolysate which may be, for example N-Z amine™ or soy protein hydrolysate. The components are blended with water as shown:

| | |
|---|---|
| Cheese whey (Krafen ™) | 3.8% (total solids basis) |
| WPC | 2.9% |
| Protein hydrolysate | 0.1% |
| Water | 93.2% |

The blended formulation (pH~6.1–6.25) is autoclaved, cooled, and inoculated with a nisin-producing culture at 0.1–1.0%. The fermentation is allowed to proceed to pH 5.5 with stirring, which requires about 7–8 hrs. The pH is then maintained at pH 5.5 for 8–10 hrs by the addition concentrated NaOH by means of a pH controller. The pH regulation is then stopped and the pH allowed to drop to pH 4.8 or lower, at about 22 hrs of total fermentation time. This resulting preparation has a nisin activity of about 2100–2800 IU/g. If necessary it may be centrifuged in order to use the supernatant only, or the whole fermented whey may be used directly.

USE OF NISIN-CONTAINING WHEY IN MEAT PRODUCTS: CHALLENGE EXPERIMENTS WITH C. botulinum

Example 4. Preparation of Gravy

The ingredients for a representative gravy formulation are shown in Table 2. For botulinum challenge studies (see Examples 8 and 9), turkey flavor, spices and color were omitted from the formulation (column 2).

TABLE 2

Formulation of Gravy

| | Actual (grams) | Percent |
|---|---|---|
| Nisin-containing whey | 1308.64 | 81.79 |
| Nonfat dry milk | 107.68 | 6.73 |
| COFLO 67 starch | 61.60 | 3.85 |
| Sodium lactate | 17.76 | 1.11 |
| Potassium lactate | 7.52 | 0.47 |
| Total of actual product tested | 1503.20 | 93.95 |
| Turkey flavor 135035 | — | 2.50 |
| Spice mix | — | 3.45 |
| Caramel | — | 0.10 |
| Total from formula | | 100.00 |

The nisin-containing whey prepared as in Example 2 and having a pH of 4.5 was weighed into a tared pan. Nonfat dry milk was then dissolved in the mixture, followed by the addition of the starch with stirring, and finally the sodium lactate and potassium lactate. The pan was heated slowly with constant stirring to 190° F., then cooled. A control sample was prepared in the same manner except that cold water was used in place of the nisin-containing whey. The pH of the gravy made with nisin-containing whey was 5.57; the control gravy made with water had a pH of 6.6.

Example 5. Formulation of Cooked Turkey and Preparation of Turkey and Gravy Sealed in Pouches.

The composition used to prepare cooked turkey breast is shown in Table 3.

TABLE 3

Turkey Composition

| Ingredient | Weight (g) | Percent |
|---|---|---|
| Turkey Breast Halves | 42.11 | 64.79 |
| Ground Breast | 7.42 | 11.41 |
| Potassium Chloride | 0.24 | 0.37 |
| Sodium Lactate | 2.03 | 3.13 |
| Potassium Lactate | 0.68 | 1.05 |
| Sodium Chloride | 0.40 | 0.61 |
| Sodium Tripolyphosphate | 0.20 | 0.30 |
| Water | 11.92 | 18.34 |
| TOTAL | 65.00 | 100.00 |

The raw turkey is combined with the other ingredients and cooked at 160° F. It is then chilled to 40° F. and sliced. Gravy (either gravy made with nisin-containing whey or control gravy) is prepared according to the formula in Example 4. It is cooked to 190° F. and cooled to 40° F. The gravy is added to the turkey (35% gravy/65% turkey by weight) and mixed. The turkey-gravy mixture is filled into pouches and heat sealed after drawing a vacuum. The sealed pouches are cooked to 165° F. in 190° F. water for 30 min. and cooled to 40° F.

Example 6. Clostridium botulinum strains used in the challenge studies

The following strains (see Table 4) were blended to prepare inocula of C. botulinum for use in the challenge studies with turkey preserved using nisin-containing whey.

TABLE 4

C. botulinum strains Used in Challenge Studies

| Proteolytic Strains | | Non-Proteolytic Strains | |
|---|---|---|---|
| Strain | Spore Count/ml | Strain | Spore Count/ml |
| 33A | $2.6 \times 10^5$ | 17B | $\sim 3 \times 10^5$ |
| 36A | $5.4 \times 10^4$ | Alaska Type E | $\sim 3 \times 10^5$ |
| 62A | $1.3 \times 10^5$ | Beluga Type E | $\sim 3 \times 10^5$ |
| 213B | $3.7 \times 10^5$ | | |
| 53B | $2.0 \times 10^5$ | | |
| ACC1B | $3.4 \times 10^5$ | | |

No growth of the spores was observed on brain-heart infusion agar incubated under aerobic conditions. Thus the spore suspensions were essentially free of aerobic spores. For the proteolytic strains, 1 ml aliquots of each of the strains were combined and heat-shocked at 80° C. for 10 min. This suspension was assayed under anaerobic conditions on McClung's egg yolk agar and found to contain $10^5$ spores/ml. For the non-proteolytic strains, 1 ml aliquots of each of the strains were combined and heat-shocked at 60° C. for 13 min. This suspension was assayed anaerobically on McClung's egg yolk agar and shown to contain $10^5$ spores/ml. Finally, 1 ml each of the proteolytic and non-proteolytic suspensions was added, in separate bottles, to 99 ml unbuffered sterile water to yield $2 \times 10^3$ CFU/ml. 5 ml of this $10^3$/ml inoculum was added to 100 grams of the turkey-gravy product to achieve about 100 spores/g.

Example 7. Nisin Treatment

For nisin treatment of turkey and inclusion in gravy, 3.6 grams of Nisaplin™ ($10^6$ nisin IU/g) were suspended in 3000 grams of sterile water. Assay for nisin activity yielded 1500 IU/g. Turkey slices were dipped in the nisin suspension for 90 seconds. Turkey gravy was made according to the formula in Example 4 (Table 2), using water (control), a nisin suspension in water, as well as with nisin-containing whey. The turkey and gravy food mixture was also prepared using these variations. The pH and nisin activity in these preparations are shown in Table 5.

TABLE 5 pH and nisin activity in experimental turkey and gravy compositions.

|  | Gravy | | Gravy and Turkey | |
| --- | --- | --- | --- | --- |
|  | pH | Nisin (IU/g) | pH | Nisin (IU/g) |
| Control | 6.5–6.7 | ND | 6.33–6.44 | ND |
| Nisin Suspension | 6.29 | 850 | 6.38 | 450 | containing purified nisin (Nisaplin™, Aplin & Barrett Ltd., Trowbridge, England), according to the formulas presented in Examples 4 and 5.

Separate bacterial challenge studies were implemented for inocula of non-proteolytic strains of *C. botulinum* and of proteolytic strains of *C. botulinum*. The bacterial inocula contained the strains disclosed in Example 6. A heat shocked suspension of the respective spores (1 ml at $\sim 1 \times 10^5$/ml) was added to 10 ml sterile water. This entire suspension was then blended with 800 g of a control or experimental turkey and gravy composition that had been prepared according to Examples 4 and 5. The spore count in the resulting products is about 100 spores/g. They were incubated at 86° F. for various periods of time, and assayed for pH, nisin concentration, aerobic colony count, anaerobic colony counts for non-proteolytic and for proteolytic strains of *C. botulinum*, and by a mouse bioassay for botulinum toxin production. The results are shown in Table 6.

TABLE 6

Efficiency of Nisin as an Inhibitor of *Clostridium botulinum* Growth and Toxin Production in Turkey and Gravy

|  |  | 0 Days at 86° F. | 2 Days at 86° F. | 3 Days at 86° F. |
| --- | --- | --- | --- | --- |
| Turkey and Gravy Control |  |  |  |  |
| Product pH |  | 6.33 | 6.27 | 6.32 |
| Nisin Concentration (U/g) |  | ND | NT | NT |
| Aerobic Background (CFU/g) |  | <10 | 150 | >$10^3$ |
| *C. botulinum* Nonproteolytic (CFU/g) | uninoculated | <10 | <10 | <10 |
|  | inoculated | 190 | $6.3 \times 10^4$ | $9.5 \times 10^5$ |
| *C. botulinum* Proteolytic (CFU/g) | uninoculated | <10 | <10 | <10 |
|  | inoculated | 100 | $\geq 3.0 \times 10^5$ | $\geq 3.0 \times 10^6$ |
| Mouse bioassay toxin assay | uninoculated | negative | negative | negative |
|  | Nonproteolytic inoculated | negative | positive | positive |
|  | Proteolytic | negative | positive | positive |
| Turkey and Gravy With Added Nisin |  |  |  |  |
| Product pH |  | 6.35 | 6.24 | 6.35 |
| Nisin Concentration (U/g) |  | 450 | 100 | 120 |
| Aerobic Background (CFU/g) |  | <10 | <10 | <10 |
| *C. botulinum* Nonproteolytic (CFU/g) | uninoculated | <10 | <10 | <10 |
|  | inoculated | 210 | $\geq 3.0 \times 10^5$ | $9.9 \times 10^6$ |
| *C. botulinum* Proteolytic (CFU/g) | uninoculated | <10 | <10 | <10 |
|  | inoculated | 160 | $\geq 3.0 \times 10^5$ | $\geq 3.0 \times 10^6$ |
| Mouse bioassay toxin assay | uninoculated | negative | negative | negative |
|  | Nonproteolytic inoculated | negative | positive | positive |
|  | Proteolytic inoculated | negative | positive | positive |

TABLE 5-continued pH and nisin activity in experimental turkey and gravy compositions.

|  | Gravy | | Gravy and Turkey | |
| --- | --- | --- | --- | --- |
|  | pH | Nisin (IU/g) | pH | Nisin (IU/g) |
| Nisin-containing Whey | 5.57 | 900 | 6.12 | 130 |

ND = none detected

Example 8. *Clostridium botulinum* challenge study using gravy supplemented with purified nisin Turkey and gravy mixed compositions were prepared using a control gravy containing water and lactate, and gravy The results in Table 6 show that turkey and gravy prepared with nisin added to the gravy develops the same or higher *C. botulinum* count as does the control turkey and gravy, by day 2 of incubation at 86° F. Likewise, the appearance of botulinum toxin is the same for the experimental sample and the control sample. This is so even though the product was prepared to contain commercial nisin at about two times the nisin activity of product made with cultured whey (see Example 9). These results indicate that inclusion of commercial nisin offers no benefit in inhibiting the growth of *C. botulinum* and the production of botulinum toxin.

Example 9. *Clostridium botulinum* challenge study using gravy supplemented with nisin-containing whey Turkey and gravy mixed compositions were prepared using a control gravy containing water and lactate, and gravy formulated with nisin-containing whey, according to the formulas presented in Examples 4 and 5. The remainder of the experiment was conducted in the same way as set forth in Example 8 for gravy containing purified nisin. The results are shown in Table 7.

formulation was noted at 48 hours, but toxin was not detected until 54 hours. The proteolytic *C. botulinum* in samples with nisin-containing whey grew to high numbers by 72 hours but the toxin was not detected until 94 hours. It was noted that a small level of Bacillus present in the control

TABLE 7

Efficiency of Cultured Whey as an Inhibitor of *Clostridium botulinum* Growth and Toxin Production in Turkey and Gravy
Non-proteolytic suspension: $1.3 \times 10^5$ CFU/ml
Proteolytic suspension: $2.3 \times 10^5$ CFU/ml

| | Time (Hours) at 86° F. | | | | | | | | | | | |
|---|---|---|---|---|---|---|---|---|---|---|---|---|
| | 0 | 18 | 24 | 30 | 36 | 42 | 48 | 54 | 60 | 66 | 72 | 86 |
| Turkey and Gravy Control | | | | | | | | | | | | |
| Product pH | 6.44 | 6.27 | 6.30 | 6.30 | 6.31 | 6.26 | 6.23 | 6.20 | 6.25 | 6.32 | 6.29 | 6.26 |
| Nisin Concentration (U/g) | ND | NT | ND | NT | NT | NT | ND | NT | NT | NT | ND | NT |
| Aerobic background (CFU/g) | 60* | NT | 20* | NT | NT | NT | $1.7 \times 10^{5*}$ | NT | NT | NT | $>1.0 \times$ | NT |
| *C. botul.* Non-proteolytic (CFU/g) | | | | | | | | | | | | |
| Uninoculated | <10 | NT | <10 | NT | NT | NT | <10 | <10 | NT | <10 | <10 | <10 |
| Inoculated | 370 | NT | 100 | NT | NT | NT | 250 | 370 | NT | $9.0 \times 10^4$ | $5.2 \times 10^5$ | $1.0 \times 10^6$ |
| *C. botul.* Proteolytic (CFU/g) | | | | | | | | | | | | |
| Uninoculated | <10 | NT | <10 | NT | NT | NT | <10 | <10 | NT | <10 | <10 | <10 |
| Inoculated | 340 | NT | 430 | NT | NT | NT | $1.5 \times 10^5$ | $6.1 \times 10^3$ | NT | $3.3 \times 10^5$ | $6.9 \times 10^7$ | NT |
| Mouse bioassay toxin results: | | | | | | | | | | | | |
| Uninoculated | — | — | — | — | — | — | — | — | — | — | — | — — |
| Non-proteloytic Inoculated | — | — | — | — | † | † | † | NT | † | NT | † | † |
| Proteolytic Inoculated | — | — | — | — | — | — | — | † | † | † | † | † |

| | Time (Hours) at 86° F. | | | | | | | | | | | | |
|---|---|---|---|---|---|---|---|---|---|---|---|---|---|
| | 0 | 18 | 24 | 30 | 36 | 42 | 48 | 60 | 66 | 72 | 86 | 94 | 158 |
| Turkey and Gravy with Nisin-Containing Whey | | | | | | | | | | | | | |
| Product pH | 6.12 | 6.06 | 6.05 | 6.04 | 6.06 | 6.00 | 5.98 | 6.00 | 6.07 | 6.09 | 5.98 | 6.10 | 6.08 |
| Nisin Concentration (U/g) | 130 | NT | 100 | NT | NT | NT | 100 | NT | NT | 100 | NT | NT | 76 |
| Aerobic background (CFU/g) | 50* | NT | 20* | NT | NT | NT | 30* | NT | <10 | <10 | 10 | <10 | 10* |
| *C. botul.* Non—proteolytic (CFU/g) | | | | | | | | | | | | | |
| Uninoculated | <10 | NT | <10 | NT | NT | NT | <10 | NT | <10 | <10 | <10 | <10 | <10 |
| Inoculated | 390 | NT | 160 | NT | NT | NT | <10 | NT | <10 | 780 | 110 | <10 | 120 |
| *C. botul.* Proteolytic (CFU/g) | | | | | | | | | | | | | |
| Uninoculated | <10 | NT | NT | NT | NT | <10 | NT | <10 | <10 | <10 | <10 | <10 | |
| Inoculated | 250 | NT | 40 | NT | NT | NT | 1600 | NT | <100 | $5.3 \times 10^5$ | $\geq 3.0 \times 10^6$ | $5.2 \times 10^5$ | $1.3 \times 10^6$ |
| Mouse bioassay toxin results: | | | | | | | | | | | | | |
| Uninoculated | — | — | — | — | — | — | — | — | — | — | — | — | — |
| Non—proteloytic Inoculated | — | — | — | — | — | — | — | — | † | † | † | NT | NT |
| Proteolytic Inoculated | — | — | — | — | — | — | — | — | — | — | — | † | † |

Key:
* Bacillus spp.;
ND is "none detected";
NT is "not tested";
— indicates "Toxin Absent";
† indicates "Toxin Present."

The results in Table 7 show that use of the nisin-containing whey of the invention resulted in a delay of toxin production, compared to the control which contains lactate. In the control samples growth of nonproteolytic *C. botulinum* was not seen until 66 hours, although the samples produced toxin by 36 hours. In the samples formulated with nisin-containing whey the nonproteolytic *C. botulinum* showed some growth at 72 hours but the samples became toxic at 66 hours. Growth of proteolytic strains in the control preparations grew to a high population in the control in 48 hours. In the samples formulated with nisin-containing whey the growth of Bacillus was inhibited at least until 158 hours. Thus the cultured whey-containing product delayed toxin production by the significant intervals of 30 hours (nonproteolytic strains) and 40 hours (proteolytic strains) as compared to the respective controls.

That which is claimed is:

1. A stabilized meat product comprising cooked meat and nisin-containing whey.

2. The stabilized meat product described in claim 1, wherein the nisin-containing whey is prepared by a process comprising the steps of
   (i) inoculating a pasteurized dairy composition with a culture of a nisin-producing microorganism;
   (ii) incubating the composition until the pH attains a value between about 6.2 and about 4.0 and a whey and curd mixture is formed; and
   (iii) separating the whey from the whey and curd mixture, wherein the separated whey is the nisin-containing whey.

3. The stabilized meat product described in claim 1, wherein the nisin-containing whey is prepared by a process comprising the sequential steps of
   (i) preparing an aqueous composition comprising sweet whey from the fermentation of a cheese fortified with whey protein concentrate and a protein hydrolysate;
   (ii) fermenting the aqueous composition with a nisin-producing culture until the pH attains about 5.5;
   (iii) maintaining the pH of the fermenting composition at about 5.5 for 8–10 hrs; and
   (iv) allowing the pH of the fermenting composition to drop to 4.8 or lower, wherein the resulting composition comprises the nisin-containing whey.

4. The stabilized meat product described in claim 1 wherein the meat product inhibits the growth of microorganisms chosen from the group consisting of *Clostridium botulinum, C perfringens, Listeria monocytogenes, Bacillus cereus, Staphylococcus aureus*, and *Enterococcusfaecalis*.

5. The stabilized meat product described in claim 4 wherein the microorganism is *C. botulinum*.

6. The stabilized meat product described in claim 1 wherein the nisin-containing whey is added in a proportion from about 3% to about 50% by weight.

7. The stabilized meat product described in claim 6 wherein the proportion of nisin-containing whey ranges from about 25% to about 35% by weight.

8. The stabilized meat product described in claim 1 wherein the cooked meat is beef, pork, lamb, poultry, fish, seafood, or a mixture thereof.

9. The stabilized meat product described in claim 8 wherein the cooked meat is chosen from the group consisting of turkey, chicken, duck, or a mixture thereof.

10. The stabilized meat product described in claim 9 wherein the cooked meat is turkey.

11. The stabilized meat product described in claim 1 further comprising a gravy.

12. The stabilized meat product described in claim 1 wherein the meat product contains essentially no nitrite salts.

13. The stabilized meat product of claim 1, wherein the nisin-containing whey is other than whey permeate.

14. A method of making a stabilized meat product, said method comprising the steps of
    (i) preparing a composition comprising meat and nisin-containing whey, and
    (ii) cooking the composition.

15. The method of making the stabilized meat product described in claim 14 wherein the nisin-containing whey is prepared by a process comprising the steps of
    (i) inoculating a pasteurized dairy composition with a culture of a nisin-producing microorganism;
    (ii) incubating the composition until the pH attains a value between about 6.2 and about 4.0 and a whey and curd mixture is formed; and
    (iii) separating the whey from the whey and curd mixture, wherein the separated whey is the nisin-containing whey.

16. A method as defined in claim 14, wherein the nisin-containing whey is obtained by a process comprising the sequential steps of
    (i) preparing an aqueous composition comprising sweet whey from the fermentation of a cheese fortified with whey protein concentrate and a protein hydrolysate;
    (ii) fermenting the aqueous composition with a nisin-producing culture until the pH attains about 5.5;
    (iii) maintaining the pH of the fermenting composition at about 5.5 for 8–10 hrs; and
    (iv) allowing the pH of the fermenting composition to drop to 4.8 or lower, wherein the resulting composition comprises the nisin-containing whey.

17. The method of making the stabilized meat product described in claim 14 wherein the meat product inhibits the growth of microorganisms chosen from the group consisting of *Clostridium botulinum, C. perfringens, Listeria monocytogenes, Bacillus cereus, Staphylococcus aureus*, and *Enterococcus faecalis*.

18. The method of making the stabilized meat product described in claim 17 wherein the microorganism is *C. botulinum*.

19. The method of making the stabilized meat product described in claim 14 wherein the nisin-containing whey is added in a proportion from about 3% to about 50% by weight.

20. The method of making the stabilized meat product described in claim 19 wherein the proportion of nisin-containing whey ranges from about 25% to about 35% by weight.

21. The method of making the stabilized meat product described in claim 14 wherein the meat is beef, pork, lamb, poultry, fish, seafood, or a mixture thereof.

22. The method of making the stabilized meat product described in claim 21 wherein the meat is chosen from the group consisting of turkey, chicken, duck, or a mixture thereof.

23. The method of making the stabilized meat product described in claim 22 wherein the meat is turkey.

24. The method of making the stabilized meat product described in claim 14 further comprising a gravy.

25. The method of making the stabilized meat product described in claim 14 wherein essentially no nitrite salts are added.

26. A method as defined in claim 14, wherein the nisin-containing whey is obtained by a process consisting essentially of the sequential steps of
    (i) preparing an aqueous composition comprising sweet whey from the fermentation of a cheese fortified with whey protein concentrate and a protein hydrolysate;
    (ii) fermenting the aqueous composition with a nisin-producing culture until the pH attains about 5.5;
    (iii) maintaining the pH of the fermenting composition at about 5.5 for 8–10 hrs; and
    (iv) allowing the pH of the fermenting composition to drop to 4.8 or lower, wherein the resulting composition comprises the nisin-containing whey.

27. The method of making the stabilized meat product described in claim 26, wherein the whey is other than whey permeate.

28. The method of making the stabilized meat product described in claim 14, wherein the whey is other than whey permeate.

29. A method of inhibiting the growth of pathogenic microorganisms in cooked meat, comprising the steps of
(i) preparing a composition comprising meat and nisin-containing whey,
(ii) sealing the cooked composition into packaging, and
(iii) cooking the composition; wherein the amount of nisin-containing whey is effective to inhibit the growth of pathogenic microorganisms.

30. The method described in claim 29 wherein the nisin-containing whey is prepared by a process comprising the steps of
(i) inoculating a pasteurized dairy composition with a culture of a nisin-producing microorganism;
(ii) incubating the composition until the pH attains a value between about 6.2 and about 4.0 and a whey and curd mixture is formed; and
(iii) separating the whey from the whey and curd mixture, wherein the separated whey is the nisin-containing whey.

31. A method as defined in claim 29, wherein the nisin-containing whey is obtained by a process comprising the sequential steps of
(i) preparing an aqueous composition comprising sweet whey from the fermentation of a cheese, whey protein concentrate, and a protein hydrolysate;
(ii) fermenting the aqueous composition with a nisin-producing culture until the pH attains about 5.5;
(iii) maintaining the pH of the fermenting composition at about 5.5 for 8–10 hrs; and
(iv) allowing the pH of the fermenting composition to drop to 4.8 or lower, wherein the resulting composition comprises the nisin-containing whey.

32. The method described in claim 29 wherein the microorganisms are chosen from the group consisting of *Clostridium bolulinum*, *C. perfringens*, *Listeria monocytogenes*, *Bacillus cereus*, *Staphylococcus aureus*, and *Enterococcus faecalis*.

33. The method described in claim 32 wherein the microorganisms are *C. botulinum*.

34. The method described in claim 29 wherein the nisin-containing whey is added in a proportion from about 3% to about 50%, by weight.

35. The method described in claim 34 wherein the proportion of nisin-containing whey ranges from about 25% to about 35% by weight.

36. The method described in claim 29 wherein the meat is beef, pork, lamb, poultry, fish, seafood, or a mixture thereof.

37. The method described in claim 36 wherein the meat is chosen from the group consisting of turkey, chicken, duck, or a mixture thereof.

38. The method described in claim 37 wherein the meat is turkey.

39. The method described in claim 29 further comprising a gravy.

40. The method described in claim 29 wherein essentially no nitrite salts are added.

41. A method of making a stabilized meat product, said method comprising the steps of
(i) preparing a composition comprising meat and nisin-containing whey, and
(ii) cooking the composition, wherein the nisin-containing whey is prepared by a process consisting essentially of the steps of:
(a) inoculating a pasteurized dairy composition with a culture of a nisin-producing microorganism;
(b) incubating the composition until the pH attains a value between about 6.2 and about 4.0 and a whey and curd mixture is formed; and
(c) separating the whey from the whey and curd mixture, wherein the separated whey is the nisin-containing whey.

42. The method of making the stabilized meat product described in claim 41,. wherein the whey is other than whey permeate.

43. The method of making the stabilized meat product described in claim 41, wherein the proportion of nisin-containing whey ranges from about 25% to about 35% by weight.

* * * * *